ID: 106. COMPOSITIONS, COATING OR PLASTIC.

Patented Jan. 4, 1938

2,104,353

UNITED STATES PATENT OFFICE 2,104,353

COMPOSITION OF MATTER FOR ARTIFICIAL STONE

Garabed Paghchoian, Waverley, Mass.

No Drawing. Application October 27, 1936, Serial No. 107,803

2 Claims. (Cl. 106—24)

This invention relates to a composition of matter for use in making artificial stone, and to the process of making the same.

Artificial stone in accordance with my invention may be molded or cast into any of a wide variety of building elements or shapes, such as blocks, slabs, bricks, bars, posts, sills, caps, shingles, and structural framing or partitioning members, or it may be applied in a plastic condition directly to the surface to be protected.

My novel composition exhibits many valuable characteristics. Among these are its relatively low cost, its high tensile strength and its durable weathering property. It is water and moisture proof, fire resistant, and has good insulating properties as regards heat, cold, and sound. It hardens and sets in a uniform manner, rapidly, and without surface distortion or cracking. It has a relatively low expansion coefficient so as not to be injuriously affected by expansion and contraction tendencies, due to temperature changes. It is light in weight and may be sawed and nailed like ordinary lumber, and when nailed has no tendency to crack or split at the nail holes.

In appearance, it normally exhibits a neutral surface, which however, possesses an attractive gloss or sheen. It may be colored as desired, however, and stipple effects may be imparted to it while it is still plastic by simple manipulation of a brush, trowel or the like.

The materials from which my composition is made are readily available and some of them are materials now considered to be waste materials or materials for which there has been heretofore little or no industrial use.

The procedure followed in producing my product is simple, easy, and inexpensive, and can be carried out with the minimum of apparatus and by unskilled labor.

My composition may consist of the following ingredients, which are combined in substantially the following proportions by weight:

| | | |
|---|---|---|
| Asbestos fibres (mixed) | pounds | 10 |
| Portland cement | do | 10 |
| Waterproofer | do | ½ |
| Coke ash liquor | gallons | 1½ |
| Coriander seed | ounces | 3 |

I prefer to use a mixture of different grades of asbestos fibres which vary perhaps as to the length or strength of their fibre.

The Portland cement may be any of the well-known brands available on the market.

The waterproofer for the Portland cement may be any of the standard materials now on the market, as for example "Medusa".

The coke ash liquor is obtained by wetting coke ashes with water, and drawing off the liquor and with it the water soluble constituents of the coke ash, among which may be sodium silicate, hydroxide of lime, iron, and alumina.

The coriander seed keeps the mix soft and plastic and gives a beautiful gloss or sheen to the finished product.

In making artificial stone from such a composition, I may proceed as follows:—

I first dry mix the different grades of asbestos (if different grades rather than a single grade are used) in a suitable container. I next add the Portland cement and the waterproofer, either singly or together. This is a dry mix which is stirred until all lumps are eliminated.

I prepare the coke ash liquor by wetting coke ash with water and drawing off the liquor. To this I add the coriander seed, with or without the addition of more water, and I then pour the coke ash liquor and coriander seed upon the dry mix of asbestos fibres, Portland cement and waterproofer and stir thoroughly.

The mixture is then poured into a mold of the shape necessary to produce the particular article of manufacture wanted. Such mold is of conventional type. It may be suitably lined, as with a "Solka" or equivalent lining sheet.

The mass is allowed to set and harden in the mold for from six to eight hours, more or less, depending upon temperature and humidity conditions after which pressure is applied on top of the mass to squeeze out the excess water, and the mass allowed to remain in the mold for a few hours to dry out.

When it is dried and set, it is troweled or otherwise treated while still in the mold to develop a smooth glossy surface and/or to harden any part thereof which may need to be harder than any other part, or to impart a stipple or other effect.

Thereafter, the mass is allowed to remain in the mold for from 24 to 48 hours, depending upon conditions, until thoroughly dried out. Or the drying time may be shortened by artificially drying the mass.

When dry, it is removed from the mold, and washed with clean water, if necessary, and again dried. It is now ready for use as a building or structural element.

Sand in suitable amount may be added to the mix if desired, or by increasing the amount of Portland cement, the product may be made harder.

Various other modifications in materials, proportions, and procedure may obviously be resorted to within the spirit and scope of my invention as defined by the appended claims.

What I therefore claim and desire to secure by Letters Patent is:—

1. A new composition of matter for making stone comprising asbestos fibres, Portland cement, coke ash liquor, and coriander seed.

2. The composition of claim 1, the materials being present in substantially the following proportions by weight, asbestos fibres 10 pounds, Portland cement 10 pounds, coke ash liquor one and one-half gallons, and coriander seed 3 ounces.

GARABED PAGHCHOIAN.